US011691826B2

(12) United States Patent
Ziegler

(10) Patent No.: US 11,691,826 B2
(45) Date of Patent: Jul. 4, 2023

(54) METHOD AND SYSTEM FOR CHANGING ARTICLE PITCH

(71) Applicant: Graphic Packaging International, LLC, Atlanta, GA (US)

(72) Inventor: Kelly W. Ziegler, Crosby, MN (US)

(73) Assignee: Graphic Packaging International, LLC, Atlanta, GA (US)

(*) Notice: Subject to any disclaimer, the term of this patent is extended or adjusted under 35 U.S.C. 154(b) by 42 days.

(21) Appl. No.: 17/332,017

(22) Filed: May 27, 2021

(65) Prior Publication Data

US 2021/0371209 A1 Dec. 2, 2021

Related U.S. Application Data

(60) Provisional application No. 63/031,763, filed on May 29, 2020.

(51) Int. Cl.

*B65G 47/26* (2006.01)
*B65G 47/84* (2006.01)
*B65G 47/24* (2006.01)

(52) U.S. Cl.

CPC ........... *B65G 47/26* (2013.01); *B65G 47/846* (2013.01); *B65G 47/24* (2013.01); *B65G 2201/0252* (2013.01); *B65G 2203/0225* (2013.01)

(58) Field of Classification Search

None

See application file for complete search history.

(56) References Cited

U.S. PATENT DOCUMENTS

| | | | |
|---|---|---|---|
| 2,535,473 A | 12/1950 | Wolford | |
| 2,835,963 A | 5/1958 | Thomson, Jr. | |
| 3,261,734 A | 7/1966 | Long | |
| 3,313,667 A | 4/1967 | Flood | |
| 3,714,756 A | 2/1973 | Macinnes | |
| 3,717,239 A * | 2/1973 | Carter | B65G 47/71 198/374 |
| 3,862,486 A | 1/1975 | Mcardle | |
| 3,959,949 A | 6/1976 | Benno et al. | |
| 4,163,686 A | 8/1979 | Risi | |
| 4,215,460 A | 8/1980 | Amberg et al. | |
| 4,236,305 A | 12/1980 | Hetherington et al. | |
| 4,318,685 A | 3/1982 | Konstantin | |

(Continued)

FOREIGN PATENT DOCUMENTS

| | | |
|---|---|---|
| DE | 42 09 671 C1 | 9/1993 |
| EP | 0 761 538 A1 | 3/1997 |

(Continued)

OTHER PUBLICATIONS

International Search Report and Written Opinion for PCT/US2021/034437 dated Sep. 17, 2021.

*Primary Examiner* — William R Harp

(74) *Attorney, Agent, or Firm* — Womble Bond Dickinson (US) LLP

(57) ABSTRACT

A method of changing article pitch. The method can comprise receiving a series of articles arranged at a first pitch, engaging the articles of the series of articles sequentially with a gripper wheel, moving the articles along a path of travel with the gripper wheel, and moving the articles relative to one another from the first pitch to a second pitch during the moving the articles along the path of travel with the gripper wheel.

34 Claims, 14 Drawing Sheets

(56) References Cited

U.S. PATENT DOCUMENTS

| | | | | |
|---|---|---|---|---|
| 4,401,020 | A | 8/1983 | Brux | |
| 4,470,241 | A | 9/1984 | Parry et al. | |
| 4,519,178 | A | 5/1985 | Crabb, Jr. | |
| 4,519,186 | A | 5/1985 | Winter et al. | |
| 4,570,415 | A | 2/1986 | Centeno | |
| 4,668,327 | A | 5/1987 | Voltmer et al. | |
| 4,674,270 | A | 6/1987 | Ton | |
| 4,729,811 | A | 3/1988 | DiFrank | |
| 5,024,718 | A | 6/1991 | Hannen | |
| 5,040,355 | A | 8/1991 | Tirelli | |
| 5,241,743 | A | 9/1993 | Hubbs et al. | |
| 5,275,681 | A | 1/1994 | Hettier | |
| 5,569,351 | A | 10/1996 | Menta | |
| 5,779,835 | A | 7/1998 | Rello et al. | |
| 6,145,183 | A | 11/2000 | Mauer | |
| 6,354,427 | B1 | 3/2002 | Pickel et al. | |
| 6,484,478 | B1 | 11/2002 | Arends et al. | |
| 7,581,635 | B2 * | 9/2009 | Lecomte | B65G 47/30 198/474.1 |
| 7,596,928 | B2 | 10/2009 | Irwin | |
| 8,458,874 | B2 | 6/2013 | Ziegler | |
| 9,452,898 | B2 * | 9/2016 | Marti Sala | B65G 29/00 |
| 9,567,162 | B2 * | 2/2017 | Martí | B65G 47/848 |
| 9,623,522 | B2 | 4/2017 | Ziegler | |
| 10,245,687 | B2 | 4/2019 | Ziegler | |
| 10,807,807 | B2 | 10/2020 | Ziegler | |
| 11,014,204 | B2 | 5/2021 | Ziegler | |
| 11,053,086 | B2 | 7/2021 | Ziegler | |
| 2003/0153447 | A1 | 8/2003 | Block et al. | |
| 2009/0277140 | A1 | 11/2009 | Tsuruta et al. | |
| 2011/0079123 | A1 | 4/2011 | Irwin | |
| 2019/0127156 | A1 | 5/2019 | Eusebione et al. | |
| 2020/0283179 | A1 * | 9/2020 | Johansen | B65B 35/58 |

FOREIGN PATENT DOCUMENTS

| | | | |
|---|---|---|---|
| EP | 0 870 684 | A1 | 10/1998 |
| JP | 2547963 | Y2 | 9/1997 |
| JP | 2000-072243 | A | 3/2000 |
| JP | 2019-194121 | A | 11/2019 |
| KR | 10-2001-0076228 | A | 8/2001 |
| WO | WO 02/089099 | A2 | 11/2002 |
| WO | WO 2007/046137 | A1 | 4/2007 |

* cited by examiner

METHOD AND SYSTEM FOR CHANGING ARTICLE PITCH

CROSS-REFERENCE TO RELATED APPLICATIONS

This application claims the benefit of U.S. Provisional Patent Application No. 63/031,763, filed on May 29, 2020.

INCORPORATION BY REFERENCE

The disclosures of U.S. Provisional Patent Application No. 63/031,763, filed on May 29, 2020, U.S. patent application Ser. No. 17/239,947, filed on Apr. 26, 2021, and U.S. Provisional Patent Application No. 63/016,607, filed on Apr. 28, 2020, are hereby incorporated by reference for all purposes as if presented herein in their entirety.

BACKGROUND OF THE DISCLOSURE

The present disclosure generally relates to methods and systems for manipulating articles. More specifically, the present disclosure is directed to methods and systems for changing the spacing between articles in a packaging system, for example.

SUMMARY OF THE DISCLOSURE

In general, one aspect of the disclosure is directed to a method of changing article pitch. The method can comprise receiving a series of articles arranged at a first pitch, engaging the articles of the series of articles sequentially with a gripper wheel, moving the articles along a path of travel with the gripper wheel, and moving the articles relative to one another from the first pitch to a second pitch during the moving the articles along the path of travel with the gripper wheel.

In another aspect, the disclosure is generally directed to a system for at least partially changing article pitch. The system can comprise a gripper wheel having a gripper wheel axis and comprising a plurality of gripper assemblies rotating about the gripper wheel axis. The gripper assemblies of the plurality of gripper assemblies can sequentially engage respective articles of a series of articles and can move the articles along a path of travel. The system further can comprise a spreader wheel positioned relative to the gripper wheel so that the gripper assemblies engage with the spreader wheel. The engagement between the gripper assemblies and the spreader wheel can cause the gripper assemblies to move the respective articles relative to one another along the path of travel as the gripper assemblies rotate about the gripper wheel axis.

Additional aspects, features, and advantages of the present invention will become apparent from the following description and accompanying figures.

BRIEF DESCRIPTION OF THE DRAWINGS

Those skilled in the art will appreciate the above stated advantages and other advantages and benefits of various additional embodiments reading the following detailed description of the embodiments with reference to the below-listed drawing figures. It is within the scope of the present disclosure that the above-discussed aspects be provided both individually and in various combinations.

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION OF THE EXEMPLARY EMBODIMENTS

The present disclosure generally relates to a system and method of manipulating containers or other articles in a system and method for forming packages that can include carriers holding the containers or other articles. The containers can be used for packaging food and beverage products, for example. The containers can be made from materials suitable in composition for packaging the particular food or beverage item, and the materials include, but are not limited to, glass; plastics such as PET, LDPE, LLDPE, HDPE, PP, PS, PVC, EVOH, and Nylon; and the like; aluminum and/or other metals; or any combination thereof. The system and method according to the present disclosure can accommodate containers of numerous different shapes. For the purpose of illustration and not for the purpose of limiting the scope of the disclosure, the following detailed description describes beverage containers (e.g., aluminum cans) engaged by the system embodiments. In this specification, the terms "lower," "bottom," "upper," and "top" indicate orientations determined in relation to upright containers.

Figure 1A:
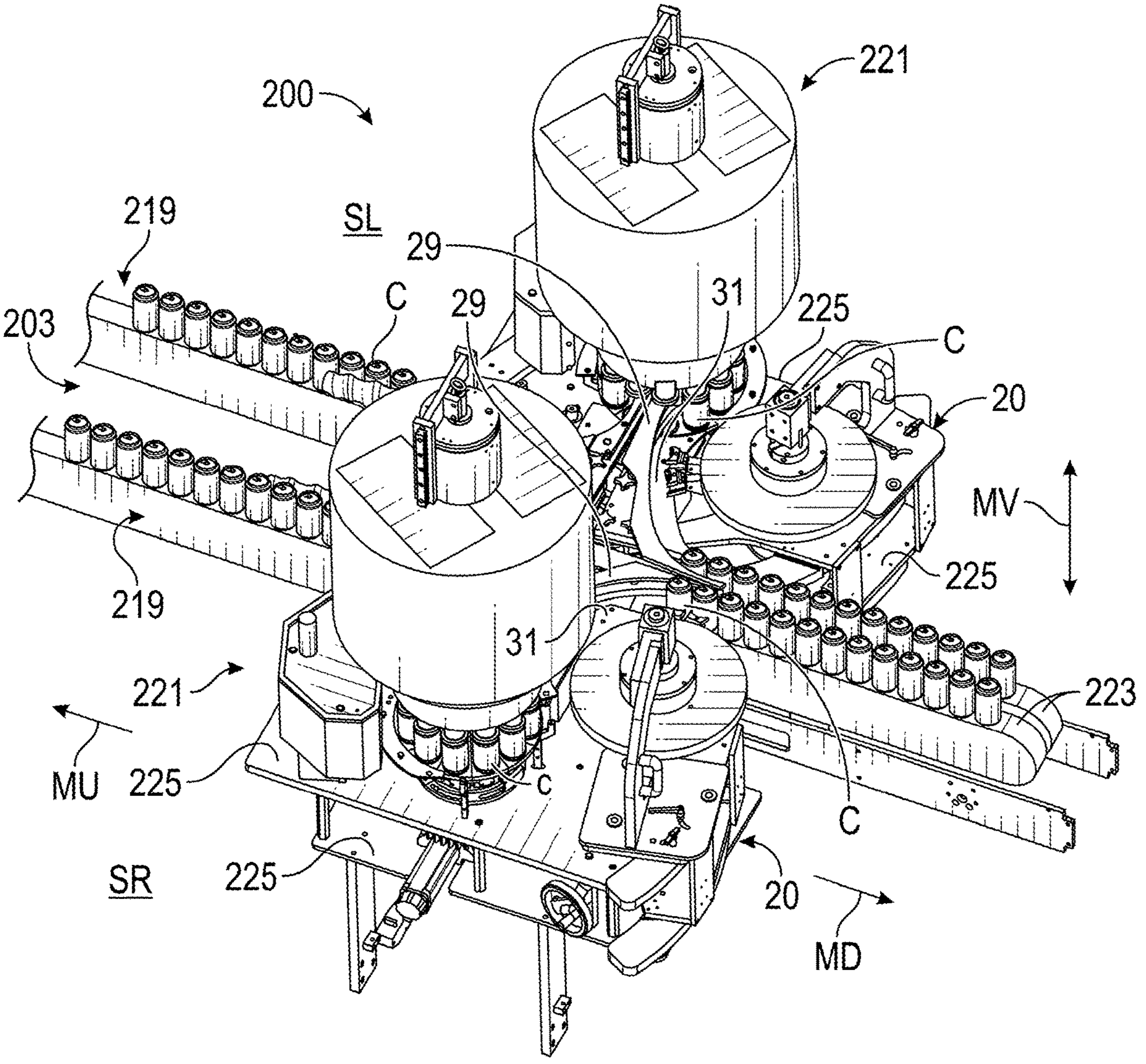
FIGS. 1A and 1B are schematic views of portions of a packaging system according to exemplary embodiments of the disclosure.
Figure 1B:
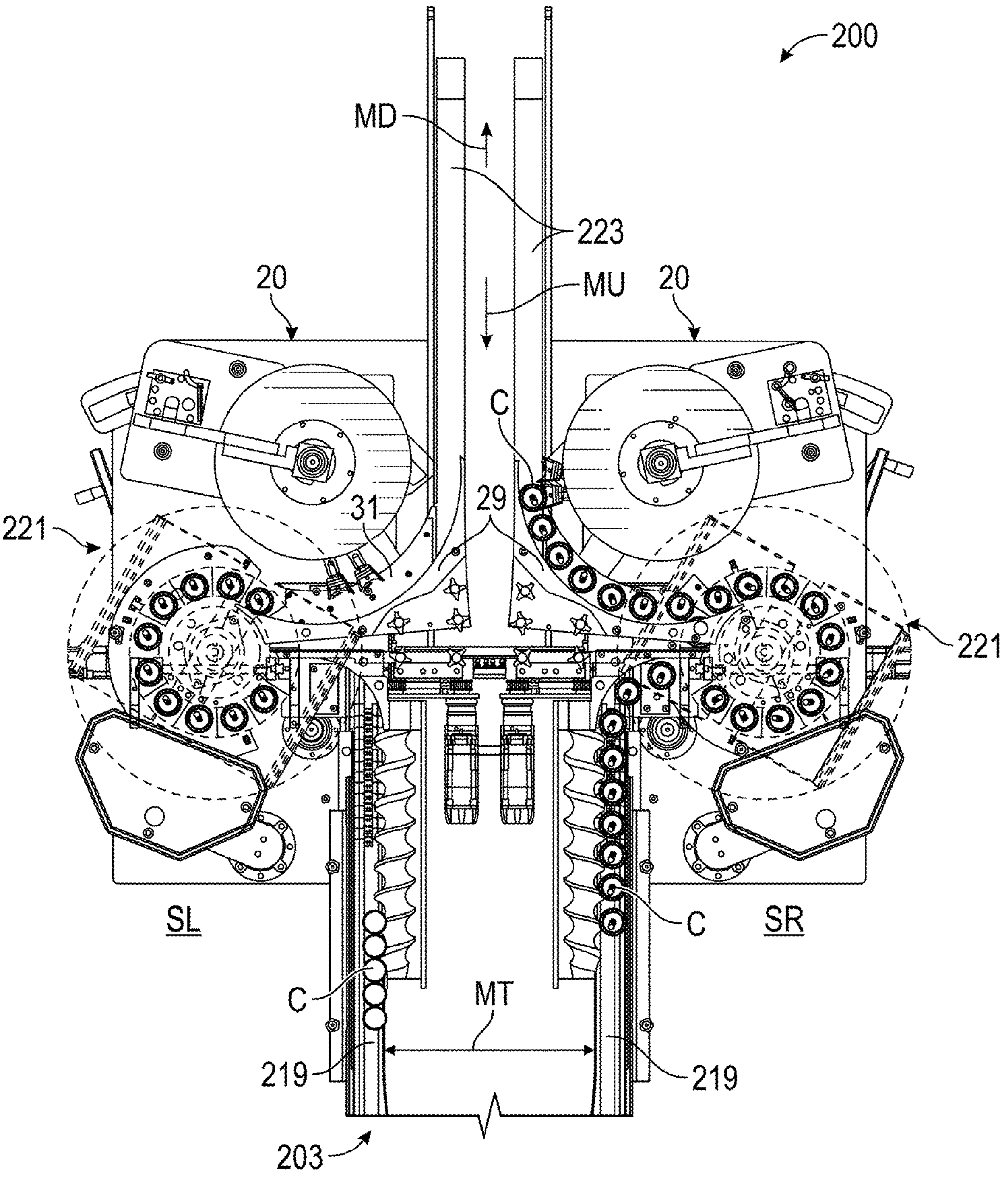
Figure 1C:
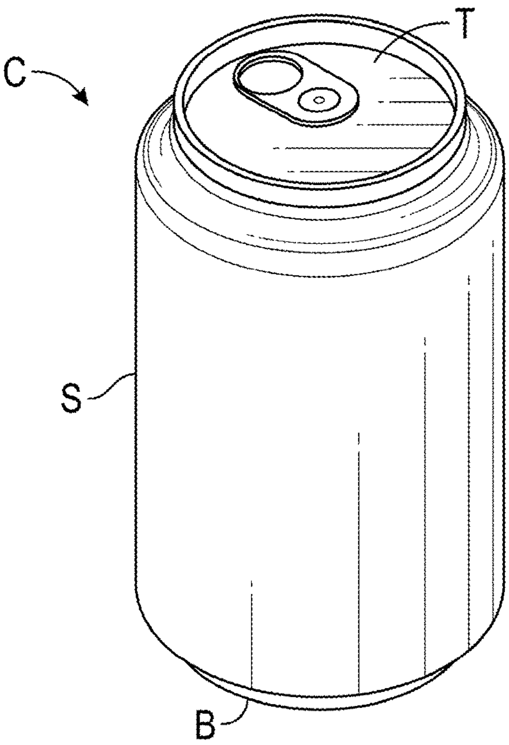
FIGS. 1C and 1D are schematic views of an exemplary container according to exemplary embodiments of the disclosure.
Figure 1D:
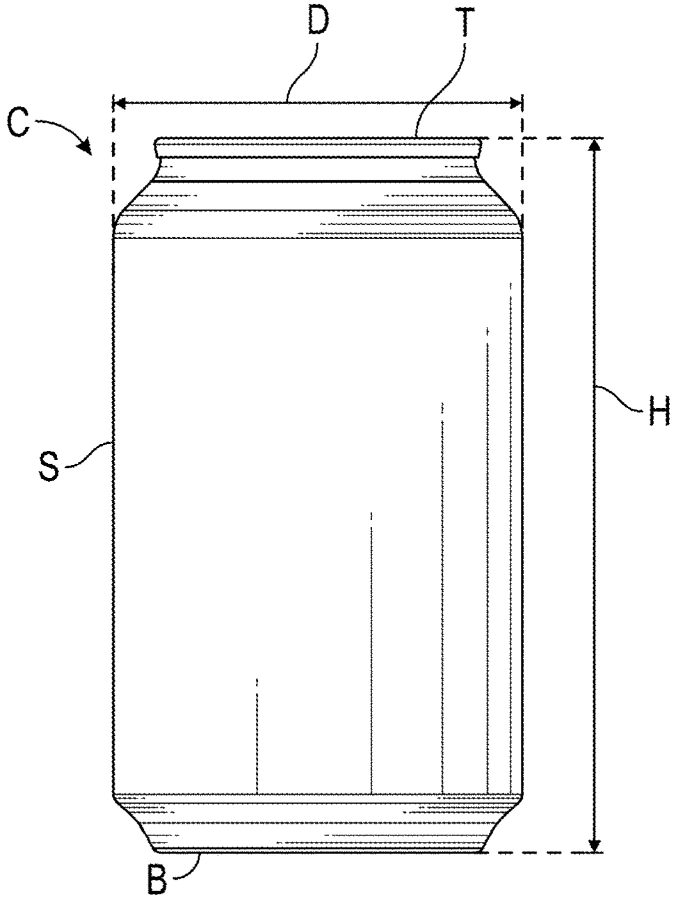

In the illustrated embodiment, each of the containers C can have a top T, a bottom B, and a side S (e.g., a curved or cylindrical side S) (FIGS. 1C and 1D). In one embodiment, the containers can be widest (e.g., can have their largest diameters) along the sides S or along at least a portion of the sides S. Alternatively, the tops T and/or bottoms B could have the same diameter (e.g., at least partially same diameter and/or approximately, substantially, and/or generally same diameter) as the sides S or larger diameters than the sides S. Each of the containers C can have a characteristic dimension D, and, in one embodiment, the characteristic dimension can be its widest dimension (e.g., its largest diameter) along the height H of the container C (e.g., FIG. 1D). In the present disclosure, the containers C can be arranged at "product pitch" when the containers are positioned in contact with one another (e.g., at their widest portions and/or characteristic dimensions D) along a line or stream of containers. For example, the containers C can be arranged in a line or stream so that each container C engages (e.g., contacts; is not spaced apart from) an adjacent downstream container and an adjacent upstream container. The containers C could be otherwise arranged, shaped, positioned, or configured without departing from the disclosure.

FIGS. 1A, 1B, and 2A-9C illustrate various example embodiments and components of systems and methods 20 for manipulating (e.g., transporting and/or changing the pitch of containers C) in a packaging system and method 200 (FIGS. 1A and 1B) for forming packages (not shown) in accordance with the disclosure. In one embodiment, the packaging system 200 can transport and position containers as part of a larger packaging system such as the system shown and described in the incorporated-by-reference 63/016,607 application or any suitable packaging system (e.g., that attaches constructs to containers, wraps constructs around containers, loads containers into cartons, etc.). In the illustrated embodiment, the packaging system 200 generally feeds the containers C at an upstream end 203 of the system 200, orients (e.g., rotates) the containers C to a desired and/or predetermined orientation, and transports the containers in the desired orientation to conveyors and positions the containers on the conveyors while changing the spacing of the containers (e.g., bringing the containers from a pitch wherein the containers are in a spaced arrangement to a product pitch arrangement on the conveyor). The conveyors can move the containers C in a downstream direction MD while the package (not shown) is formed and/or the conveyors can move the containers downstream to be packaged and/or stored.

In one embodiment, the containers C can move through the system 200 from the upstream end 203 generally in the downstream machine direction MD (downstream direction). As shown in FIGS. 1A and 1B, the system 200 can have an upstream direction MU that generally extends opposite to the downstream direction MD, a horizontal transverse direction MT that is transverse to the downstream direction MD and a vertical direction MV that is transverse to the downstream direction MD. In the present application, the system 200 can have a left side SL and a right side SR, which are determined while looking in the downstream direction MD. In one embodiment, the system 200 of the present disclosure includes an infeed apparatus 219, an orientation unit 221, the system 20 (e.g., the article repitching system 20), and a conveyor 223 on each of the left side SL and the right side SR of the packaging system 200 (e.g., on either side of the centerline of the packaging system 200 extending in the machine direction MD).

As shown in FIGS. 1A and 1B, each infeed apparatus can include conveyors and guides that move the containers C to the respective reorientation units 221 at a spaced pitch in respective streams so that each container C can be properly received by the orientation units 221. In one embodiment, each of the orientation units 221 can be mounted on a base frame including base plates 225. The orientation units 221 can use cameras and/or other sensors to determine the orientation of graphics, labels, and/or other features on the respective containers and can use motors or other suitable apparatus to selectively rotate the individual containers C (e.g., about a vertical axis of the respective containers) to move the desired features to a predetermined orientation as the orientation units 221 move the containers C along a path of travel (e.g., about a central axis of the orientation unit 221). In the illustrated embodiment, the orientation units 221 can receive the containers C from the respective infeed conveyors 219, and output the containers C in the predetermined orientation onto the respective conveyors 223 (FIGS. 1A, 1B, 2A, 2B, and 7) via the systems 20. Accordingly, the orientation units 221 can orient each container C on its axis to ensure that features (e.g., universal product codes or other information) of the containers C are inward-facing and are hidden by the other containers C in a package formed with the containers and/or to ensure that features (e.g., a label, a logo, or other information) of the containers C are facing outwardly in the resulting package for example. Alternatively, the orientation assemblies 221 could be omitted and the containers C can be received by the system 20 via a conveyor or any suitable apparatus.

In an exemplary embodiment, the containers C can be moved in the orientation unit 221 at a pitch with a particular spacing (e.g., so that the containers C can be individually reoriented by the orientation unit). Accordingly, the container C can be output from the orientation unit 221 at the spaced configuration. In the illustrated embodiment, the container repitching system 20 can engage the containers C at the pitch output by the orientation unit 221 and change the spacing between the containers C (e.g., to product pitch) while moving the containers C to the conveyor 223 and while at least partially maintaining the predetermined orientation (e.g., rotational orientation) of the containers C. Accordingly, the containers C can be positioned on the conveyor 223 at the appropriate pitch (e.g., product pitch or any suitable spacing).

As shown in FIGS. 1A and 1B, the packaging system 200 includes two repitching systems 20, one for each of the orientation units 221. In one embodiment, the repitching systems 20 can be mirror images of one another (e.g., the repitching system 20 on the right side SR of the packaging system 200 can rotate in the clockwise direction when viewed from the top and the repitching system 20 on the left side SL of the packaging system 200 can rotate in the counter-clockwise direction when viewed from the top). Only one of the repitching systems 20 is described in relation to FIGS. 2A-9C (e.g., the repitching system 20 positioned on the right side SR of the packaging system 200).

Figure 2A:
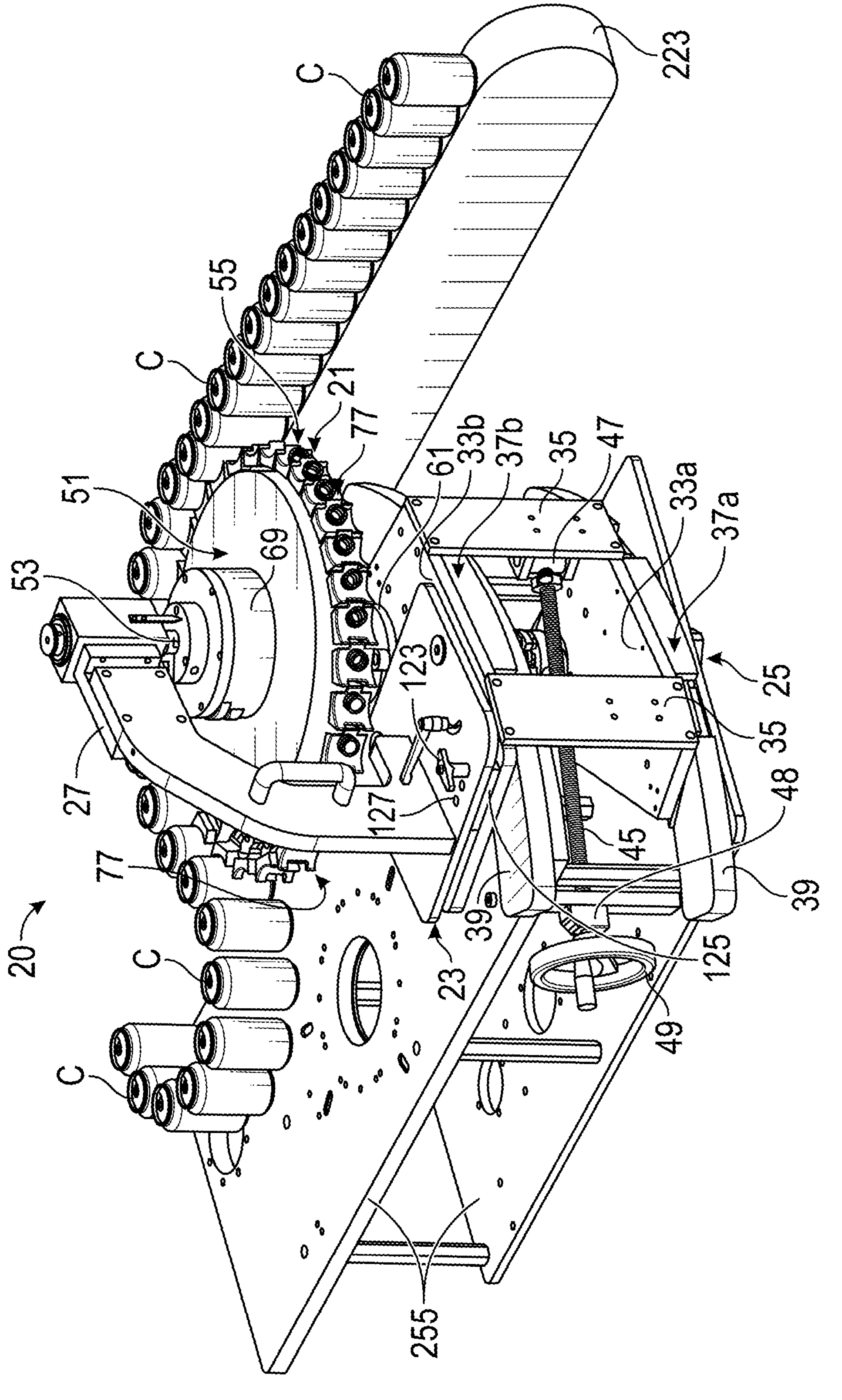
FIG. 2A is a perspective view of an article repitching system according to exemplary embodiments of the disclosure.
Figure 2B:
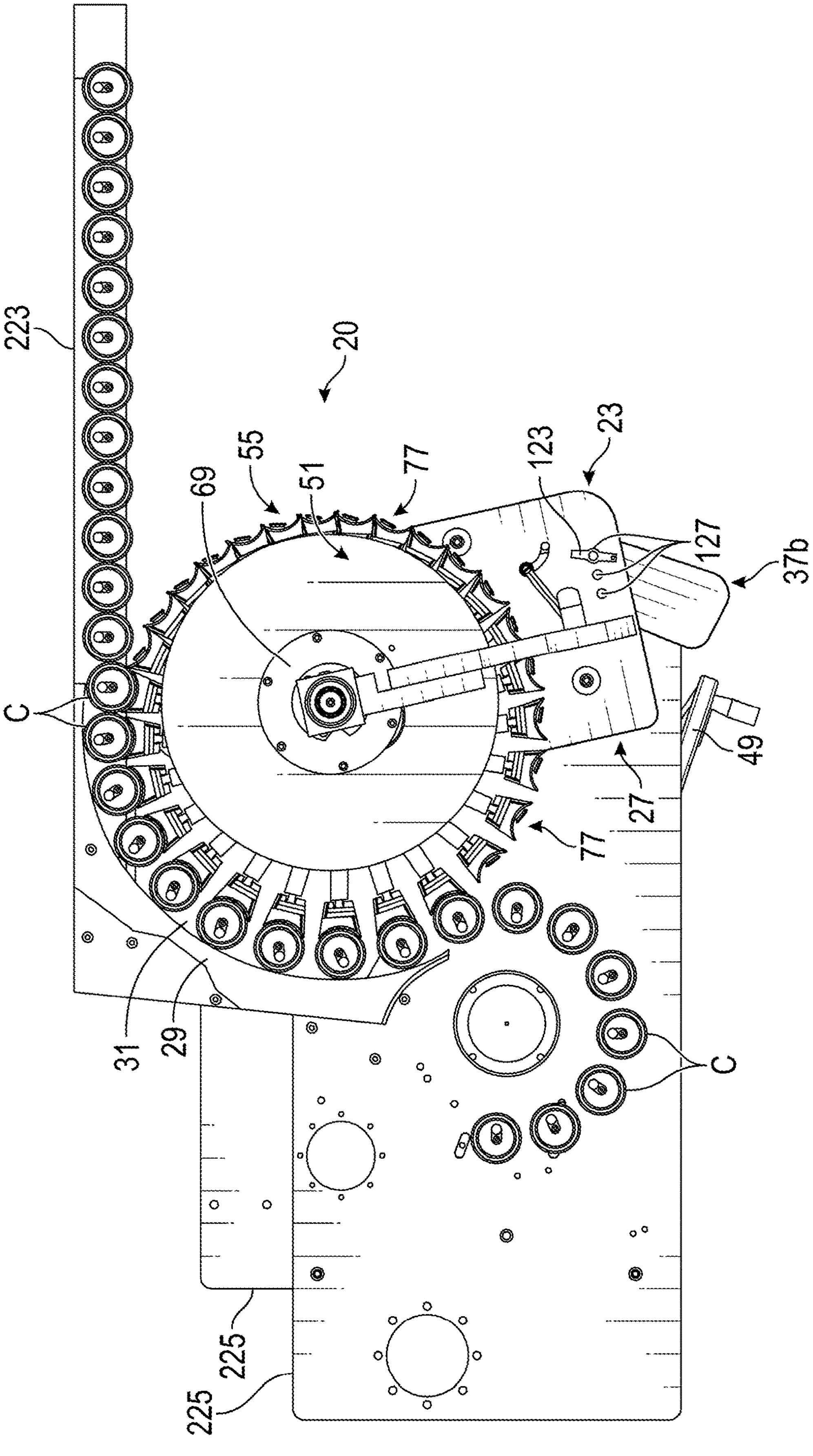
FIG. 2B is a top view of the article repitching system of FIG. 2A.
Figure 3:
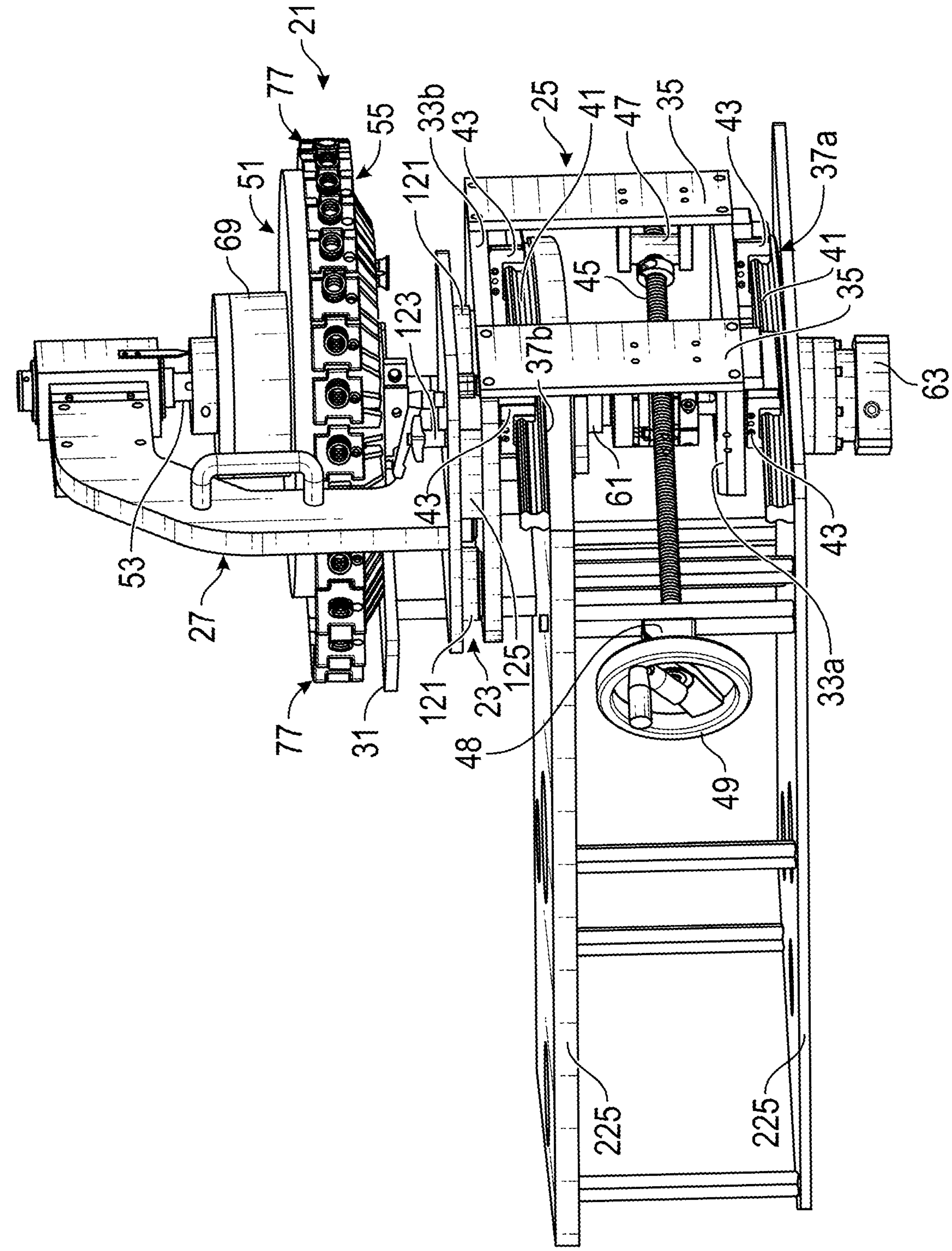
FIG. 3 is a perspective view of a portion of the article repitching system of FIG. 2A.

As shown in FIGS. 2A-3, the repitching system 20 can include a repitcher apparatus 21 mounted on a frame 23. In the illustrated embodiment, the frame 23 can include a lower frame assembly 25 mounted to the base plates 225 that support the orientation unit 221 (FIGS. 1A and 1B) and an upper frame assembly 27 mounted to the lower frame assembly 25. In an alternative embodiment, the lower frame assembly 25 can be mounted to any suitable support. As shown in FIGS. 1A, 1B, 2B, and 7, the path of travel for the containers C from the orientation unit 221 to the conveyor 223 is at least partially defined by a guide rail 29 positioned opposite to the repitcher apparatus 21. In one embodiment, the guide rail 29 can have a curved surface facing the repitcher apparatus 21 along the curved path of travel. In the illustrated embodiment, a guide plate 31 (FIGS. 1A, 1B, 2B, 3, and 9A-9C) can be mounted below the path of travel from the orientation unit 221 to the conveyor 223 for supporting the containers C from below as they are moved along the path of travel.

In one embodiment, the lower frame assembly 25 can include a lower frame plate 33*a* and an upper frame plate 33*b* connected by vertical frame elements 35. As shown in FIGS. 2A and 3, the frame plates 33*a*, 33*b* can be mounted to the respective base plates 225 by respective adjustment rail assemblies 37*a*, 37*b*. In the illustrated embodiment, each of the adjustment rail assemblies 37*a*, 37*b* can include a guard or cover 39 (FIG. 2A), a track 41 mounted to the respective base plate 225, and a pair of adjustment rail bearings 43 mounted to the undersides of the respective frame plate 33*a*, 33*b*. For each of the adjustment rail assemblies 37*a*, 37*b*, the adjustment rail bearings 43 are engaged with the track 41 so that the adjustment rail bearings 43 can translate (e.g., slide and/or roll) along the track 41. Accordingly, the lower frame assembly 25, the upper frame assembly 27 (which is mounted to the lower frame assembly 25), and the repitcher apparatus 21 (which is mounted to the frame assemblies 25, 27) can be moved relative to the base plates 225 by moving the adjustment rail bearings 43 along the tracks 41. In one embodiment, the tracks 41 can have a radius of curvature that is centered on the axis of the orientation unit 221 (e.g., FIGS. 1A and 1B).

In the illustrated embodiment, an adjustment screw 45 can be mounted to one of the vertical frame elements 35 via a hinge 47 and can be engaged with a vertical support 48 connecting the base plates 225. In one embodiment, the adjustment screw 45 can be engaged with the vertical support 48 by threads so that turning the adjustment screw 45 causes the adjustment screw 45 to move relative to the vertical support 48 (e.g., toward or away from the conveyor 223). An adjustment wheel 49 can be mounted on the end of the adjustment screw 45 so that turning the adjustment wheel 49 turns the adjustment screw 45 relative to the base plates 225 to move the repitching system 20 on the tracks 41 toward and away from the conveyor 223 and the centerline of the packaging system 200. In embodiments, the hinge 47 can pivot as the adjustment screw 45 is turned and the repitching system 20 moves on the tracks 41 to accommodate the curve of the tracks and the arc of the path of travel of the repitching system 20 on the tracks 41. Accordingly, the repitching system 20 can be adjusted relative to the path of travel of the containers C and the conveyor 223 to accommodate containers C with different diameters and/or to change the position that the containers C are deposited onto the conveyor 223. In embodiments, the position of the containers C in the transverse direction MT on the conveyor 223 can be adjusted to align the containers C with features of the constructs with which the containers C form the packages (not shown). For example, as disclosed in the incorporated-by-reference U.S. patent application Ser. No. 17/239,947 and U.S. Provisional Patent Application No. 63/016,607, packages with a deeper keel can have a blank that is wider in the MT direction so that the containers C would be placed on the conveyors 223 at a position that is farther from the centerline of the packaging system 200 in the MT direction while a package with a shallower keel can have a blank that is narrower in the MT direction and the containers C would be placed on the conveyors 223 at a position that is closer to the centerline of the packaging system 200 in the MT direction. In addition, the position of the conveyor 223 could be adjusted in the transverse direction MT for different packaging configurations and the system 20 can be adjusted accordingly by operating the adjustment wheel 49. Any aspect of the lower frame assembly 25 and/or the upper frame assembly 27 could be omitted or could be otherwise arranged, shaped, positioned, or configured without departing from the disclosure.

Figure 7:
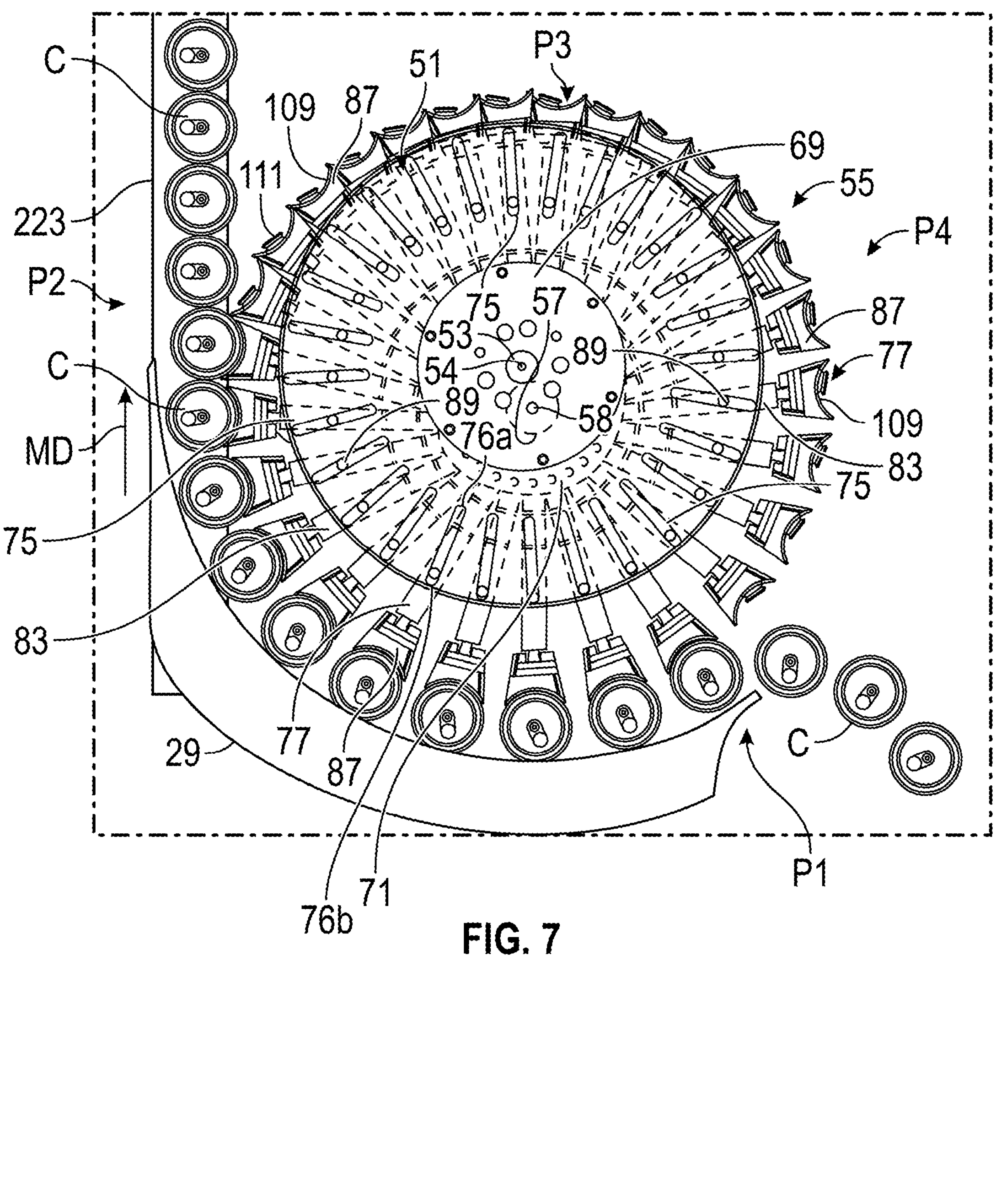
FIG. 7 is a schematic top view of a path of travel for containers in the article repitching system of FIG. 2A between a guide rail and the repitcher apparatus with a spreader wheel of the repitcher apparatus being partially transparent according to exemplary embodiments of the disclosure.

As shown in FIGS. 2A-5, the repitcher apparatus 21 can include a cam wheel or spreader wheel 51 mounted on an upper or first drive shaft 53 and a gripper wheel 55 mounted on a lower or second drive shaft 57. In the illustrated embodiment, the upper drive shaft 53 and the lower drive shaft 57 are offset from one another so that the central axis 54 (e.g., the spreader wheel axis; FIG. 7) of the spreader wheel 51 is offset from the central axis 58 (e.g., the gripper wheel axis; FIG. 7) of the gripper wheel 55. In an exemplary embodiment, the axes of the shafts 53, 57 can be offset from one another by 1³⁄₁₆ inch (e.g., approximately, substantially, and/or generally 1³⁄₁₆ inch). Alternatively, the shafts could be offset by any suitable distance. In the exemplary embodiment, the upper drive shaft 53 can be mounted to the upper frame assembly 27 by bearings 59 and the lower drive shaft 57 can be mounted to the upper frame plate 33*b* of the lower frame assembly 25 via bearings 61 (at least FIGS. 2A and 3) (the lower bearing 61 can be mounted to the frame plate 33*b* via a spacer ring, FIG. 4). In one embodiment, the lower drive shaft 57 can be coupled to a gearbox 63, which can be mounted to the lower frame plate 33*a* and can be mounted to a motor (not shown) that can rotate the lower drive shaft 57 via the gearbox and coupling at a desired rate. In embodiments, the lower drive shaft 57 and the gearbox 63 can extend through openings (not shown) in the base plates 225, wherein the openings can provide clearance for the lower drive shaft and gearbox to move relative to the base plates 225 when the repitching system 20 is adjusted on the adjustment rail assemblies 37*a*, 37*b*.

Figure 4:
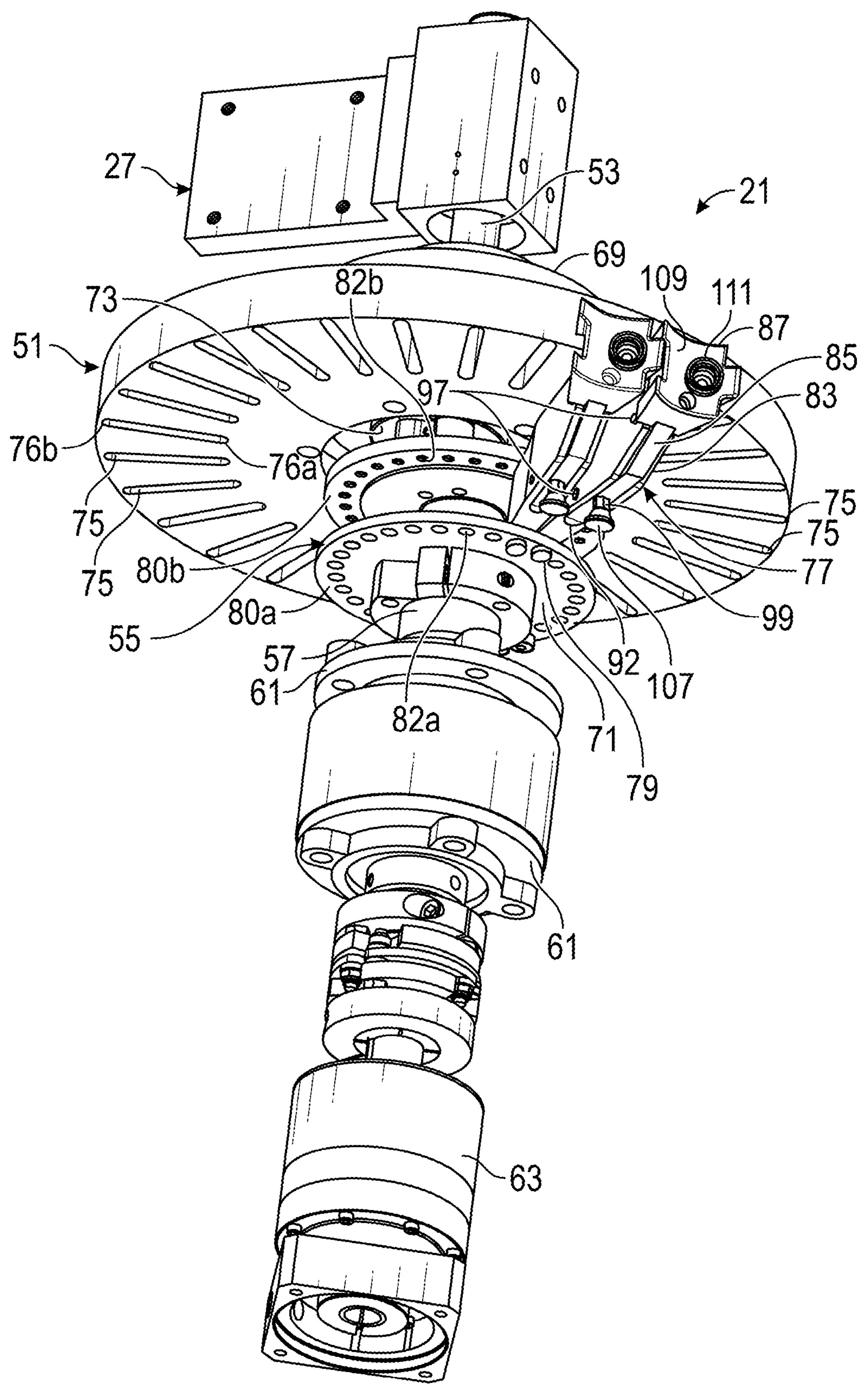
FIG. 4 is a perspective view of a repitcher apparatus of the article repitching system of FIG. 2A.
Figure 5:
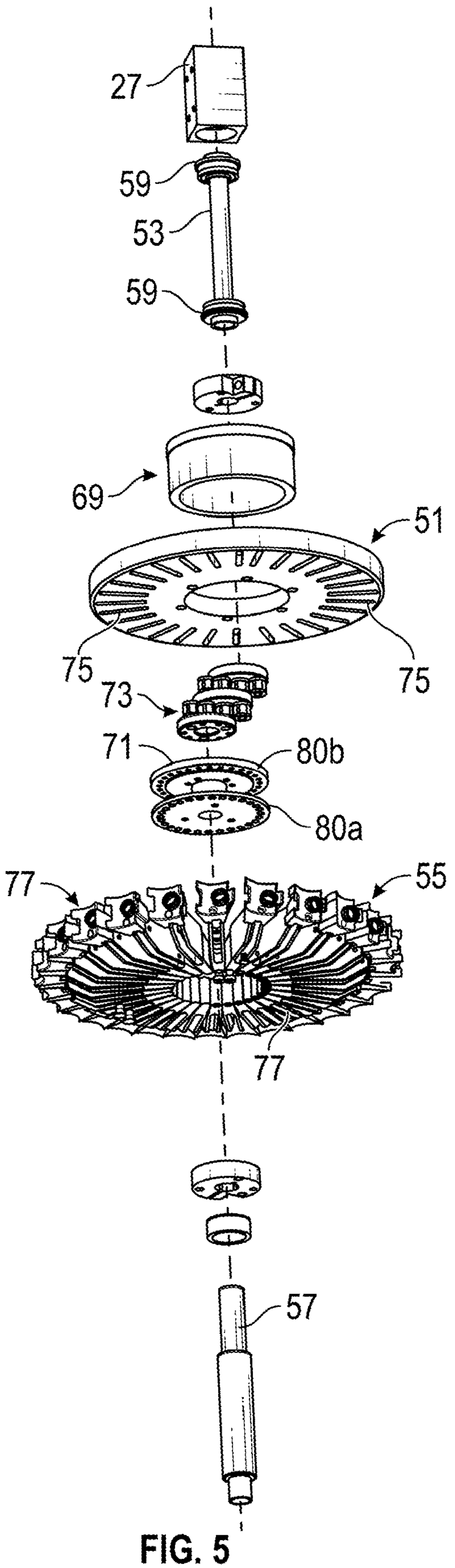
FIG. 5 is an exploded perspective view of the repitcher apparatus of FIG. 4.

In the illustrated embodiment, the upper drive shaft 53 can be mounted to the spreader wheel 51 via a drive spacer 69 (at least FIGS. 2A-5) and the gripper wheel 55 can include a hub 71 mounted to the lower drive shaft 53 (at least FIGS. 4 and 5). As shown in FIGS. 4 and 5, the hub 71 can be coupled to the upper drive shaft 53 via an offset coupling 73 that transfers the rotation of the lower drive shaft 57 on its axis (e.g., the gripper wheel axis 58), driven by the motor 65, to the offset upper drive shaft 53 so that the upper drive shaft 53 rotates on its axis (e.g., the spreader wheel axis 54) while keeping the shafts in time. Either of the upper drive shaft 53, the lower drive shaft 57, and/or the associated features could be otherwise arranged, shaped, positioned, or configured without departing from the disclosure. For example, the offset coupling 73 could be omitted and the upper drive shaft 53 could be driven by a separate motor or could be otherwise driven by the motor 65 (e.g., via drive belts). In another example, the upper drive shaft 53 could be driven by a motor or other suitable feature and the rotation could be transferred to the lower drive shaft 57 by the offset coupling 73 or another suitable feature.

As shown in at least FIGS. 4, 5, and 7, the spreader wheel 51 can include a number of equally spaced, radially extending pockets or slots 75. In the illustrated embodiment, the slots 75 can be sized to receive a pin or cam follower of the gripper wheel 55 as discussed below and are elongate, extending radially toward the periphery of the spreader wheel 51. As shown in at least FIGS. 4 and 7, each of the slots 75 can include an inner end 76*a* (e.g., nearer to the central axis 54 of the spreader wheel 51) and an outer end 76*b* (e.g., adjacent the outer edge of the spreader wheel 51). The spreader wheel 51 could be otherwise arranged, shaped, positioned, or configured without departing from the disclosure. For example, while the spreader wheel 51 is shown with twenty-eight slots 75, the spreader wheel could include any suitable number of slots. In another example, while the spreader wheel 51 is shown as being round (e.g., circular) in the figures, the spreader wheel 51 could be any suitable shape.

As shown in at least FIGS. 4, 5, and 7, the gripper wheel 55 includes a number of gripper assemblies 77 mounted around the hub 71 in side-by-side arrangement. Twenty-eight gripper assemblies 77 are mounted to the hub 71 in the illustrated embodiment. However, many of the gripper assemblies 77 are omitted in certain figures for clarity. As shown in FIG. 4, each of the gripper assemblies 77 is mounted to the hub via a shoulder screw 79 or other suitable fastener, each shoulder screw 79 extending through a bore 82*a* in a lower flange 80*a* of the hub 71 and a pivot bore 81 (FIGS. 6A and 6B) of the gripper assembly 77 and engaging a threaded bore 82*b* in an upper flange 80*b* of the hub 71 (e.g., via threaded engagement) so that a pivot end 93*b* of the gripper assembly 77 is received between the flanges 80*a*, 80*b* of the hub 71. In one embodiment, the pivot bore 81 provides clearance for the shoulder screw 79 so that the gripper assembly 77 is at least partially free to pivot about the shoulder screw 79. In an alternative embodiment, the threaded bore 82*b* could be replaced with a clearance bore and the shoulder screw 79 can extend though both clearance bores in the flanges 80*a*, 80*b* and be secured to the hub 71 with a nut or the gripper assembly 77 could be otherwise mounted to the hub 71.

Figure 6A:
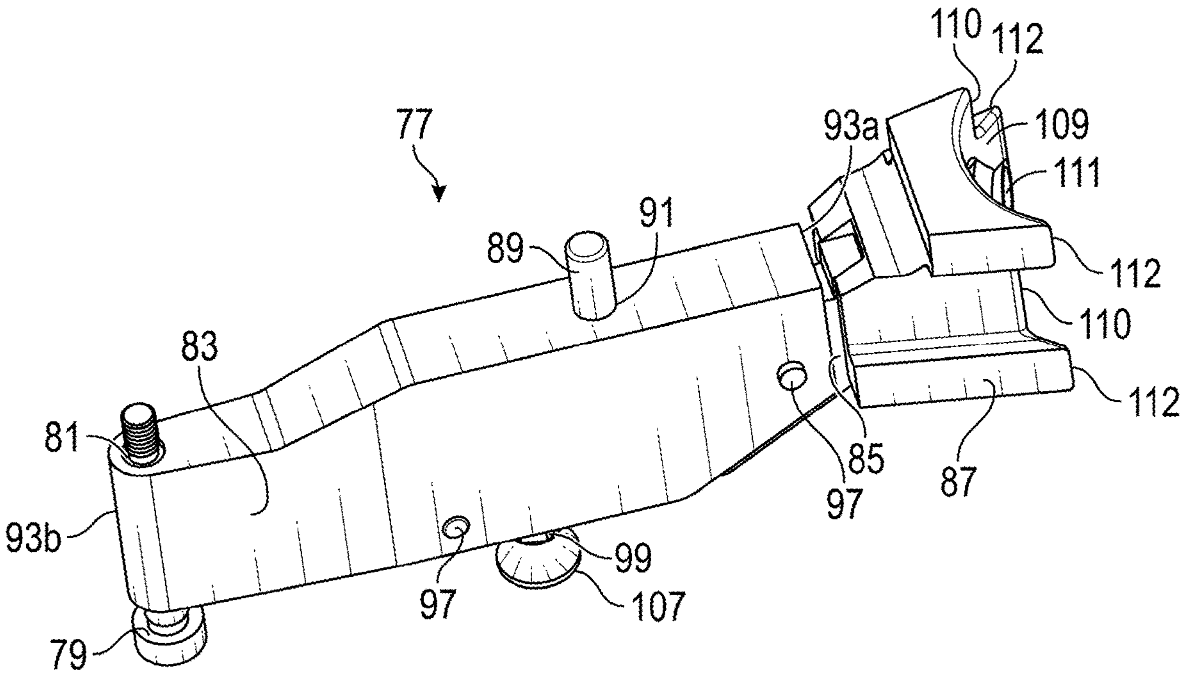
FIG. 6A is a perspective view of a gripper assembly of the repitcher apparatus of FIG. 4.
Figure 6B:
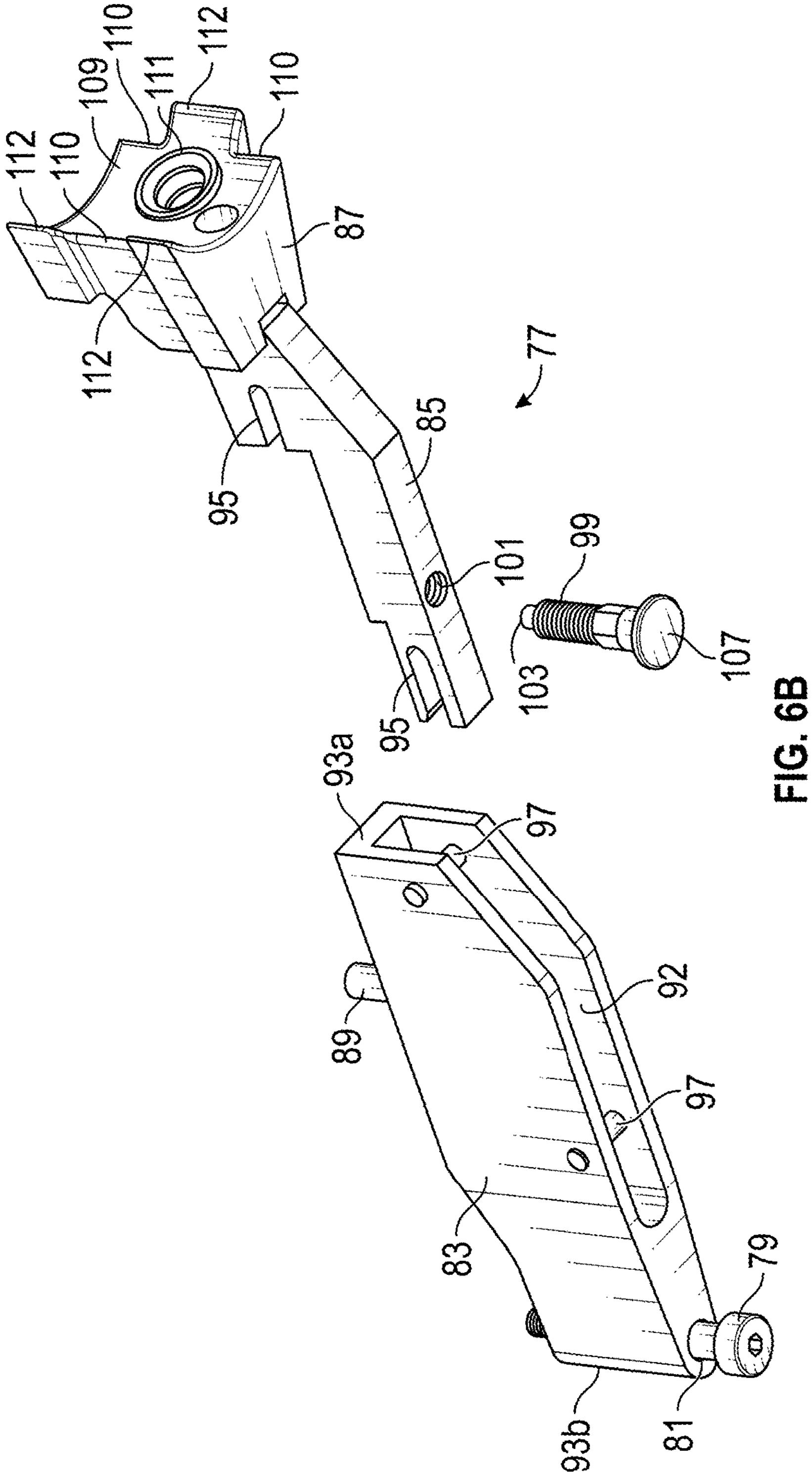
FIG. 6B is an exploded perspective view of the gripper assembly of FIG. 6A.
Figure 6C:
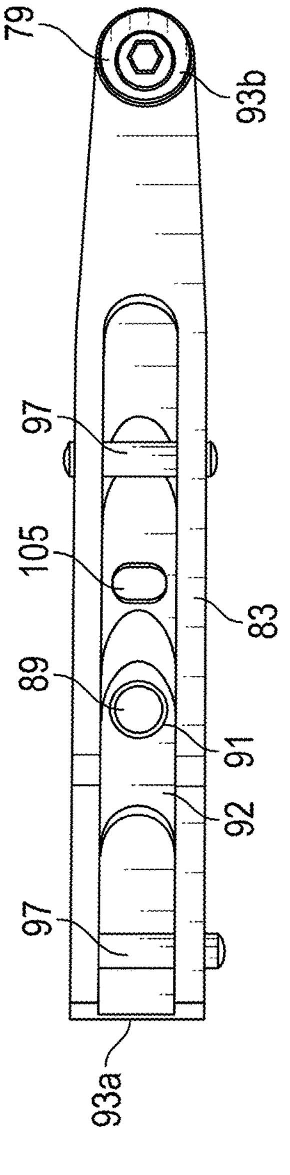
FIG. 6C is a bottom view of a gripper arm of the gripper assembly of FIG. 6A.

As shown in FIGS. 6A-6C, each of the gripper assemblies 77 can include a gripper arm 83, a change-out arm or insert arm 85 mounted at least partially in the gripper arm 83, a gripper head 87 mounted on an end of the change-out arm 85, and a pin or cam follower 89 mounted in a top bore 91 of the gripper arm 83. As shown in FIG. 6B, the change-out arm 85 can be mounted in an opening 92 extending in a portion of the distal end 93*a* and the bottom of the gripper arm 83, the distal end 93*a* being opposite to the pivot end 93*b* that includes the pivot bore 81. As shown in FIG. 6B, the change-out arm 85 includes two cutouts 95 that engage (e.g., slide onto) respective dowels 97 extending across the opening 92 of the gripper arm 83. In one embodiment, the dowels 97 can be secured in respective bores in the sides of the gripper arm 83 (e.g., by an interference fit, adhesive, threads, etc.). Accordingly, the engagement between the dowels 97 and the cutouts 95 can help retain the change-out arm 85 in the opening 92. In one embodiment, a spring plunger 99 can be threadedly engaged with a threaded bore 101 in the change-out arm 85 and can have a retractable end 103 that protrudes through the top of the change-out arm 85. Accordingly, the retractable end 103 can engage an indent 105 (FIG. 6C) in an interior surface of the opening 92 of the gripper arm 83 when the change-out arm 85 is located in the opening and the cutouts 95 engage the dowels 97. In the illustrated embodiment, the spring plunger 99 can include a spring (not shown) that can bias the retractable end 103 outwardly and can include a pull knob 107 that can pull the retractable end 103 inwardly against the bias of the spring. Accordingly, the retractable end 103 can be retracted as the change-out arm 85 slides into the opening 92 of the gripper arm 83, the retractable end 103 sliding against the interior surface of the opening 92 until it encounters the indent 105 and snaps into the indent 105 to retain the change-out arm 85 in the opening 92 with the cutouts engaging the dowels 97. The change-out arm 85 can be removed from the opening 92 by pulling the pull knob 107 to retract the retractable end 103 from the indent 105 and sliding the cutouts 95 off of the dowels 97. Accordingly, the change-out arm 85 can be removed with the gripper head 87 to be replaced. For example, the change-out arm 85 and the gripper head 87 can be replaced with a change-out arm 85 and gripper head 87 combination having a different gripper head 85 that can accommodate a different container C diameter (e.g., the gripper head 87 could have a receiving face with a different radius of curvature), having a change-out arm 85 with a different length, etc. In other examples, the change-out arm 85 and the gripper head 87 combination can be replaced due to damage, wear, etc.

As shown in at least FIGS. 6A and 6B, the gripper head 87 can be mounted on an end of the change-out arm 85 and can be positioned proximate to the distal end 93*a* of the gripper arm 83 when the change-out arm 85 is locked in place in the opening 92. In one embodiment, the gripper head 87 can be bolted to the end of the change-out arm 85 or could be otherwise secured to the change-out arm 85. In the illustrated embodiment, the gripper head 87 can have a concave receiving face 109 that is curved for engaging a respective one of the containers C. In exemplary embodiments, different gripper heads 87 could have receiving faces 109 with different radii of curvature for engaging different container sizes. In one embodiment, the receiving face 109 can be curved for engaging around approximately a third of the circumference of the side S of a container C. In one exemplary embodiment, the radius of curvature of the receiving face 109 can be configured for engaging containers C with a particular diameter or range of diameters, and the gripper heads 87 can be replaced (e.g., along with the change-out arms 85) to accommodate containers with different diameters. As shown FIGS. 6A and 6B, the gripper head 87 can include cutouts 110 that can provide clearance for portions 112 of adjacent gripper heads 87 in the gripper wheel 55 when the gripper assemblies 77 are brought close together in the repitcher apparatus 21 as described in more detail below. Alternatively, the receiving face 109 could be configured for engaging a different amount of the circumference of the container C. In the illustrated embodiment, a fender or grip element 111 can be mounted (e.g., glued or otherwise secured) in an opening in the receiving face 109 of the gripper head 87. In one embodiment, the grip element 111 can be a resilient material such as rubber or other suitable material so that the grip element 111 can at least partially deform when engaging a container C that is engaged between the receiving face 109 and the guide rail 29 (FIGS. 1A, 1B, and 2B). Accordingly, the friction between the grip element 111 and the container C can be sufficient so that the grip element 111 can help prevent the container C from rotating as the gripper head 87 moves the container C along the path of travel from the orientation unit 221 to the conveyor 223. In some embodiments, the grip element 111 can at least partially act as a buffer or shock absorber between the gripper head 87 and the container C.

As shown in at least FIGS. 6A-6C, the cam follower 89 can be secured in the top bore 91 of the gripper arm 83 (e.g., by interference fit, threaded engagement, adhesive, etc.). The cam follower 89 can protrude from the top of the gripper arm 83 so that the cam follower 89 engages a respective slot 75 in the spreader wheel 51 when the gripper arm 83 is mounted to the hub 71 in the gripper wheel 55 with the spreader wheel 51 mounted over the gripper wheel 51 (e.g., FIGS. 4 and 7). In the illustrated embodiment, the cam follower 89 can be in slidable engagement with the slot 75 so that the cam follower 89 can slide along at least a portion of the length of the slot 75 as the gripper wheel 55 and the spreader wheel 51 rotate about their offset axes as described in more detail below. Any portion of the gripper assemblies 77 could be omitted or could be otherwise arranged, shaped, positioned, or configured without departing from the disclosure.

As shown in FIG. 7, the repitcher apparatus 21 is shown from its top with the spreader wheel 51 being shown as partially transparent so that the positions of the cam followers 89 in the respective slots 75 are visible. In addition, portions of the gripper wheel 55 below the spreader wheel 51 are shown in dashed lines. The gripper assemblies 77 extend outwardly from the hub 71 where the pivot ends 93*b* of the gripper arms 83 are pivotally connected to the hub 71, which is mounted to the lower drive shaft 57. The cam followers 89 extend upwardly from the respective gripper arms 83 and the spreader wheel 51 is mounted to the upper drive shaft 53 (e.g., via the drive spacer 69) so that the cam followers 89 are received in the respective slots 75. The spreader wheel 51 and the hub 71 are rotated at the same rate (e.g., via the offset coupling 73) and the gripper assemblies 77 are thus rotated to engage the containers C at the output of the orientation unit 221, move the containers C along the path of travel to the conveyor 223, and rotate around the axis 58 of the gripper wheel 55 and the lower drive shaft 57 back to the path of travel for the containers. In the view of FIG. 7, the spreader wheel 51 and the gripper wheel 55 are rotated in a clockwise direction.

In one embodiment, since the axis 58 of the lower drive shaft 57 and the hub 71 is offset from the axis 54 of the upper drive shaft 53 and the spreader wheel 51, the gripper assemblies 77 are caused to pivot about the shoulder screws 79 and draw together progressively as they move from the output of the orientation unit 221 to the conveyor. As the spreader wheel 51 and the gripper wheel 55 are further rotated and the gripper assemblies 77 move away from the conveyor 223, the gripper assemblies 77 can continue to be drawn together as the cam followers 89 move toward the inner ends 76*a* of the slots 75 and toward the center axis 54 of the spreader wheel 51. Subsequently, the offset of the axes of the spreader wheel 51 and the gripper wheel 55 will cause the cam followers 89 to move outwardly toward the outer ends 76*b* of the slots 75 and away from the center axis 54 of the spreader wheel 51, causing the gripper assemblies 77 to pivot about the shoulder screws 79 and spread apart. In one embodiment, this is because the radial slots 75 of the spreader wheel 51 are farther apart at their outer or distal ends 76*b* than at their inner or proximal ends 76*a* and, due to the described offset, the cam followers 89 are located nearer the distal ends 76*b* of the slots 75 when the gripper assemblies 77 are positioned at the output of the orientation unit 221 (e.g., at a receiving area of the system 20) and are located nearer the proximal ends 76*a* of the slots 75 when the gripper assemblies 77 are positioned at the conveyor 223. In one embodiment, depending on how the spreader wheel 51 and gripper wheel 55 are configured relative to one another, the spacing of the containers C in the orientation unit 221, and the diameter of the containers C, the position where the gripper heads 87 are spaced farthest apart could correspond to where the gripper assemblies 77 first engage the containers C or could be before or after the gripper assemblies 77 engage the containers C (e.g., at a different position along the circumference of the gripper wheel 55). Similarly, while the gripper assemblies 77 are drawn closest together after rotating away from the conveyor 223 in the illustrated embodiment, depending on the same or similar factors, the gripper assemblies 77 could be drawn closest together where the gripper assemblies 77 disengage from the containers or before this position.

As shown in FIG. 7, the gripper assemblies 77 are shown in a first position P1 where the gripper assemblies first engage the containers C at the output of the orientation unit 221, a second position P2 where the gripper assemblies 77 disengage from the containers C at the conveyor 223, a third position P3 generally opposite to the first position P1, and a fourth position P4 generally opposite to the second position P2. Though other configurations are possible, as shown in FIG. 7, the axes of the spreader wheel 51 and the gripper wheel 55 are offset in such a way so that the cam followers 89 of the gripper assemblies 77 in position P1 are generally farthest from the axis 54 of the spreader wheel 51 and are located at the distal or outer ends 76*b* of the respective slots 75. Accordingly, the gripper heads 87 are spaced apart at position P1 for engaging the containers C at the output pitch of the orientation unit 221. In one exemplary embodiment, the output pitch of the orientation unit 221 can be made constant regardless of the diameter of the containers C. For example, the containers C could be spaced from one another by approximately 3.1 inches or any suitable distance at the output of the orientation unit 221. In position P2, the cam followers 89 have been moved in the slots 75 closer to the axis 54 of the spreader wheel 51 so that the gripper heads 87 are moved closer together, bringing the containers C to product pitch (so that the containers C engage one another). In position P3, the cam followers 89 have been moved even closer to the axis 54 of the spreader wheel 51 in the slots 75 so that the gripper heads 87 are brought even closer together (e.g., with portions 112 of the gripper heads 87 being received in the cutouts 110 of adjacent gripper heads). In position P3, the cam followers 89 have been moved away from the axis of the spreader wheel 51, spreading the gripper heads 87 apart, in an intermediate position between positions P3 and P1.

In operation, the gripper assemblies 77 are rotated around the axis 58 of the gripper wheel 55 with the spreader wheel 51 rotating about its axis 54. As shown in FIG. 7, the gripper heads 87 sequentially engage the containers C as they exit the orientation unit 221 (e.g., as they enter the path of travel at the receiving area of the system 20), the gripper heads 87 being spaced apart by a distance corresponding to the output pitch of the orientation unit 221. In embodiments, the orientation unit 221 can put the containers C under compression, and the compression can be released as the containers C enter the receiving area of the system 20. In one embodiment, one of the gripper heads 87 can engage a container C after the compression is released. Alternatively, the gripper head 87 can engage the container C before the compression is released or concurrently with the release of the compression. In the illustrated embodiment, the gripper assemblies 77 can engage the containers C between the respective receiving faces 109 and the guide rail 29 (FIGS. 1A, 1B, 2B, and 7) and the grip element 111 can engage the containers C to help prevent the containers from rotating (e.g., via friction between the grip element and the side S of the container). In an exemplary embodiment, the grip element 111 can deform when pressed between the container C and the receiving face 109. As the gripper wheel 55 rotates, the gripper heads 87 can slide the containers C on the guide plate 31 and against the guide rail 29 along the path of travel toward the conveyor 223 while the cam followers 89 are moved in the slots 75 toward the axis 54 of the spreader wheel 51, drawing the gripper assemblies together. Accordingly, the gripper heads 87 move the containers C closer together as they are moved along the path of travel toward the conveyor 223. As the containers C are moved onto the conveyor 223 by the gripper assemblies 77, the containers C are brought together into product pitch by the gripper heads 87 and the conveyor 223 can engage the bottoms B of the containers to move the containers C in the downstream direction MD. In one embodiment, additional features (e.g., guides and/or belts, not shown) can help move the containers along the conveyor 223 as they leave the gripper heads 87. In the illustrated embodiment, the gripper assemblies 77 move away from the containers C and the conveyor 223 as they rotate on the gripper wheel 55 and then can continue to rotate back toward the output of the orientation unit 221 to engage additional containers C.

Figure 8:
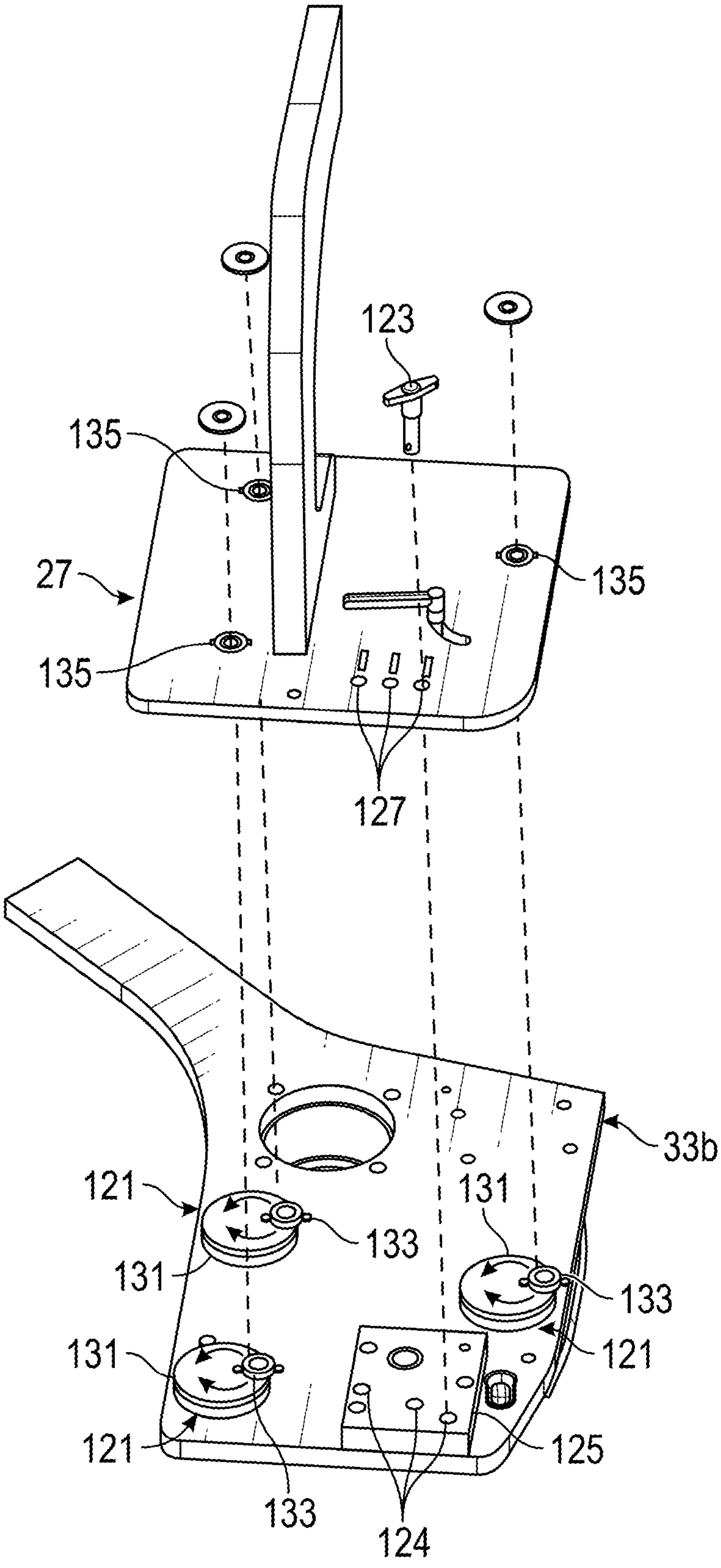
FIG. 8 is a schematic exploded perspective view of portions of a frame of the article repitching system according to exemplary embodiments of the disclosure.
Figure 9A:
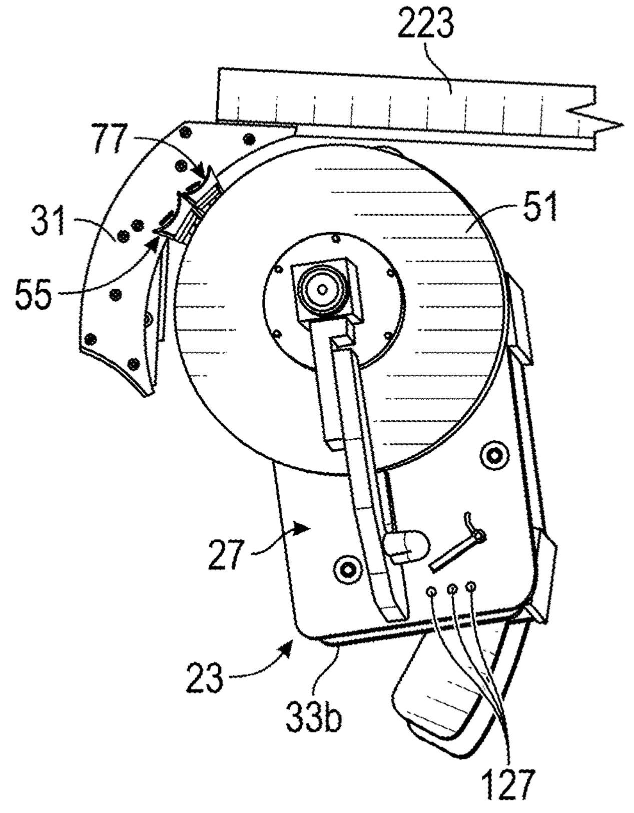
FIGS. 9A-9C are schematic views showing different configurations of the article repitching system according to exemplary embodiments of the disclosure.
Figure 9B:
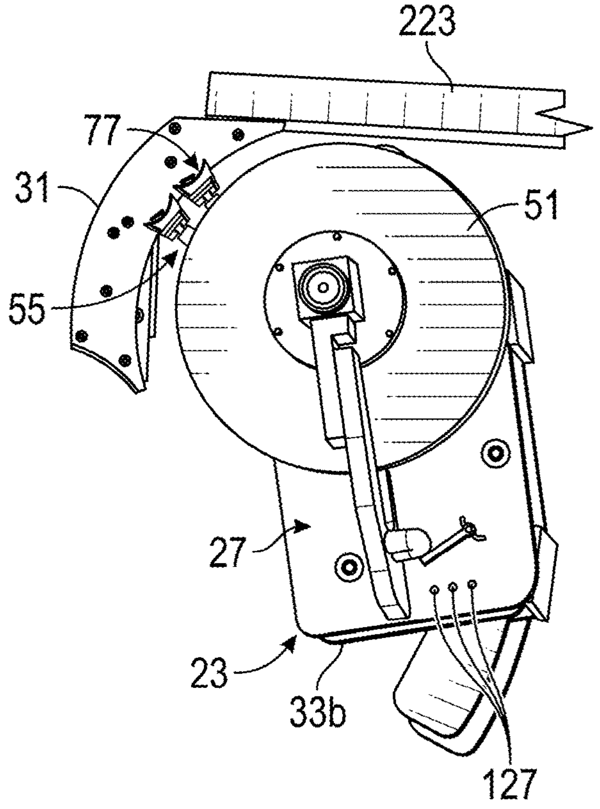
Figure 9C:
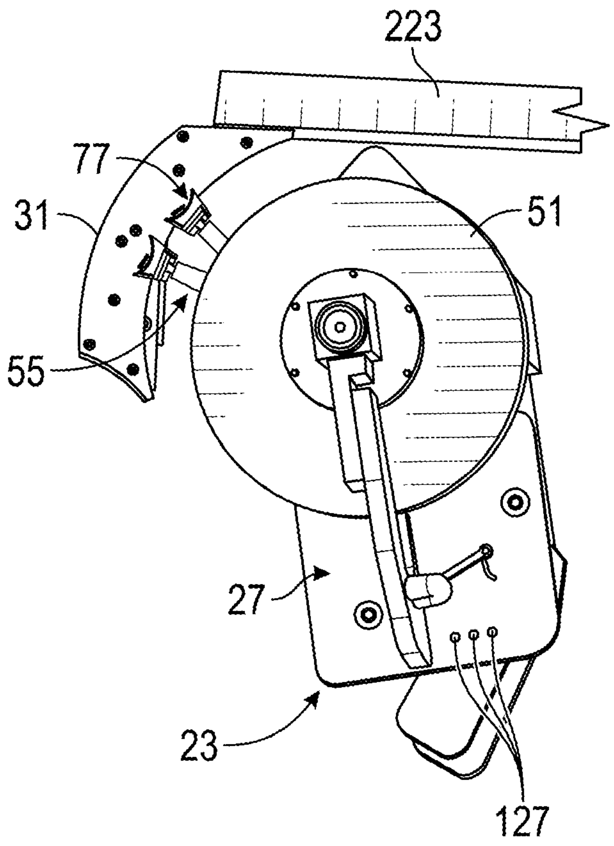

In addition to the adjustment of the system 20 on the adjustment rail assemblies 37*a*, 37*b* (e.g., to move the repitcher apparatus 21 relative to the path of travel of the containers C and/or the conveyor 223), the position of the spreader wheel 51 relative to the gripper wheel 55 can be adjusted by moving the upper frame assembly 27 relative to the lower frame assembly 25. For example, as shown in FIG. 8, the upper frame assembly 27 is mounted to the upper frame plate 33*b* of the lower frame assembly 25 by three pivot bearings 121 (or any suitable number of pivot bearings 121) that can allow the upper frame assembly 27 to move in a horizontal plane relative to the lower frame assembly 25. For example, as shown in FIG. 8, each pivot bearing 121 can include a pivot 131 mounted to the upper frame plate 33*b* so that the pivot 131 can rotate about its axis and a bearing 133 mounted on the pivot 131 so that the bearing 133 is offset from the axis of the pivot 131. In one embodiment, the bearing 133 is moved about the axis of the pivot 131 as the pivot 131 rotates about its axis. In the illustrated embodiment, the bearing 133 is at least partially received in a respective hole 135 in the base of the upper frame assembly 27 and the bearing 133 is mounted to the base of the upper frame assembly 27. In one embodiment, the upper frame assembly 27 can be locked in place by a lock pin 123 that can be selectively engaged with a preset bore 124 in an alignment block 125 mounted to the upper frame plate 33*b* via a preset hole 127 in the base of the upper frame assembly 27 (FIGS. 2A-3 and 8). In an exemplary embodiment, the preset holes 127 (e.g., three preset holes or any suitable number of preset holes) can be located in the base of the upper frame assembly 27 and the preset bores 124 (e.g., three preset bores or any suitable number of preset bores) can be located in the alignment block 125 so that when one of the preset holes 127 is aligned with a respective one of the preset bores 124 in the alignment block 125, the system 20 can be configured for a particular container diameter (e.g., 53 mm, 58 mm, 66 mm, or any suitable diameter). For example, in one embodiment, the upper frame assembly 27 can be moved relative to the lower frame assembly 25 while the pivot bearings 121 constrain the movement of the upper frame assembly 27 to the movement of the bearings 133 about the axis of the respective pivot 131. For certain positions of the upper frame assembly 27 (e.g., those associated with a particular container diameter), one of the preset holes 127 will align with a respective one of the preset bores 124 so that the lock pin 123 can be inserted into the respective preset hole 127 and preset bore 124.

In the illustrated embodiment, the movement of the upper frame assembly 27 relative to the lower frame assembly 25 can move the spreader wheel 51 (which is mounted to the upper frame assembly 27 via the upper drive shaft 53) relative to the gripper wheel 5 (which is mounted to the lower frame assembly 25 via the lower drive shaft 57). For example, the upper frame assembly 27 and the spreader wheel 51 are shown in different positions in the three views of FIGS. 9A-9C. Moving the spreader wheel 51 relative to the gripper wheel 55 changes where the cam followers 89 engage the slots 75 along the lengths of the slots 75 (e.g., at the second position P2 in FIG. 7), which affects how far apart the gripper heads 87 are spaced. For example, the spreader wheel 51 can be moved to a position so that the gripper heads 87 are closer together at the second position P2 for a container C with a smaller diameter or can be moved to a position so that the gripper heads 87 are relatively farther apart at position P2 for a container C with a relatively larger diameter (e.g., so that the system 20 is configured to place the containers C on the conveyor 223 at product pitch for that particular container diameter). In an exemplary embodiment the movement of the spreader wheel 51 relative to the gripper wheel 55 during adjustment can be constrained (e.g., by the pivot bearings 121) so that the offset between the axes of the spreader wheel 51 and the gripper wheel 55 is fixed (e.g., so that the axis of the spreader wheel 51 can move about the axis of the gripper wheel 55 on a radius equal to the fixed offset distance) and/or so that gripper heads 87 remain spaced for the discharge pitch of the orientation unit 221. Alternatively, the movement of the spreader wheel 51 relative to the gripper wheel 55 can be partially restrained or unrestrained during adjustment.

The pivot bearings 121, the lock pin 123, the preset bores 124, the alignment block 125, and/or the preset holes 127 could be omitted or could be otherwise arranged, shaped, positioned, or configured without departing from the disclosure. The position of the spreader wheel 51 relative to the gripper wheel 55 could be otherwise adjusted without departing from the disclosure.

The foregoing description of the disclosure illustrates and describes various embodiments. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, alterations, etc., of the above-described embodiments. Additionally, the disclosure shows and describes only selected embodiments, but various other combinations, modifications, and environments are within the scope of the disclosure as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A method of changing article pitch, the method comprising:

receiving a series of articles arranged at a first pitch;

engaging the articles of the series of articles sequentially with a gripper wheel, the gripper wheel comprising a plurality of gripper assemblies, wherein a spreader wheel comprises a plurality of slots, and each of the gripper assemblies comprises a cam follower that is at least partially received in a respective slot of the plurality of slots;

moving the articles along a path of travel with the gripper wheel; and moving the articles relative to one another from the first pitch to a second pitch during the moving the articles along the path of travel with the gripper wheel.

2. The method of claim 1, wherein the engaging the articles comprises engaging each of the articles with respective gripper assemblies of the plurality of gripper assemblies during the moving the articles along the path of travel.

3. The method of claim 2, wherein each gripper assembly comprises a gripper head with a concave receiving surface, and the engaging each of the articles with the respective gripper assemblies comprises positioning the receiving surface of each gripper head along at least a portion of the respective articles.

4. The method of claim 3, wherein a guide rail extends at least partially along the path of travel opposite to the gripper wheel, and the engaging each of the articles with the respective gripper assemblies comprises engaging the articles between the respective receiving surface and the guide rail during the moving the articles along the path of travel.

5. The method of claim 3, wherein each of the gripper assemblies comprises a grip element extending from the receiving face of the gripper head, and the engaging each of the articles with the respective gripper assemblies comprises pressing the grip elements against the respective articles so that the grip elements at least partially prevent rotation of the respective articles relative to the gripper heads during the moving the articles along the path of travel.

6. The method of claim 2, wherein a guide rail extends at least partially along the path of travel opposite to the gripper wheel, and the engaging each of the articles with the respective gripper assemblies comprises engaging the articles between the respective gripper assemblies and the guide rail during the moving the articles along the path of travel.

7. The method of claim 6, wherein the moving the articles along the path of travel comprises the gripper assemblies moving the respective articles along the guide rail on to a conveyor, and the method further comprises rotating the gripper assemblies away from the path of travel after the articles are moved on to the conveyor.

8. The method of claim 2, wherein the moving the articles along the path of travel comprises rotating the gripper wheel so that the gripper assemblies move the respective articles along the path of travel while the gripper assemblies are engaged with the respective articles.

9. The method of claim 2, wherein each of the gripper assemblies of the plurality of gripper assemblies comprises a pivot end that is pivotably mounted to a hub, and the moving the articles relative to one another comprises pivoting the gripping assemblies relative to one another on the respective pivot ends while the gripping assemblies are engaging the respective articles.

10. The method of claim 9, wherein the pivoting the gripping assemblies relative to one another comprises sliding the cam followers along the respective slots.

11. The method of claim 10, further comprising rotating the gripper wheel on a gripper wheel axis and rotating the spreader wheel on a spreader wheel axis, and the gripper wheel axis is offset from the spreader wheel axis, the offset between the gripper wheel axis and the spreader wheel axis causing the cam followers to slide along the respective slots while the gripper wheel and the spreader wheel are rotated on the respective gripper wheel axis and spreader wheel axis.

12. The method of claim 11, wherein the slots extend radially in the spreader wheel so that the gripper assemblies are pivoted closer together as the respective cam followers slide along the respective slots toward the spreader wheel axis and the gripper assemblies are pivoted away from one another as the respective cam followers slide along the respective slots away from the spreader wheel axis while the gripper wheel and the spreader wheel are rotated on the respective gripper wheel axis and spreader wheel axis.

13. The method of claim 10, wherein the slots extend radially in the spreader wheel and the spreader wheel is positioned relative to the gripper wheel so that the rotating the gripper wheel and the spreader wheel about the respective gripper wheel axis and spreader wheel axis causes the cam followers of the respective gripper assemblies to move toward the spreader wheel axis while the respective gripper assemblies are engaged with the respective articles causing the gripper assemblies to pivot about the respective pivot ends toward one another so that the gripper assemblies move the respective articles closer together during the moving the articles along the path of travel.

14. The method of claim 1, wherein the articles are spaced apart from one another at the first pitch, and the articles are arranged at product pitch at the second pitch.

15. A system for at least partially changing article pitch, the system comprising:

a gripper wheel having a gripper wheel axis and comprising a plurality of gripper assemblies rotating about the gripper wheel axis, the gripper assemblies of the plurality of gripper assemblies sequentially engaging respective articles of a series of articles and moving the articles along a path of travel; and a spreader wheel positioned relative to the gripper wheel so that the gripper assemblies engage with the spreader wheel, the engagement between the gripper assemblies and the spreader wheel causing the gripper assemblies to move the respective articles relative to one another along the path of travel as the gripper assemblies rotate about the gripper wheel axis;

wherein the spreader wheel comprises a plurality of slots, and each of the gripper assemblies comprises a cam follower that is at least partially received in a respective slot of the plurality of slots.

16. The system of claim 15, wherein each gripper assembly comprises a gripper head with a concave receiving surface that is positioned along at least a portion of the respective articles when the gripper assemblies engage respective articles.

17. The system of claim 16, wherein a guide rail extends at least partially along the path of travel opposite to the gripper wheel so that the articles are engaged between the respective receiving surface and the guide rail when the articles are moved along the path of travel.

18. The system of claim 16, wherein each of the gripper assemblies comprises a grip element extending from the receiving face of the gripper head, and the grip elements are pressed against the respective articles when the gripper assemblies engage respective articles so that the grip elements at least partially prevent rotation of the respective articles relative to the gripper heads when the articles are moved along the path of travel.

19. The system of claim 15, wherein the path of travel is at least partially defined between a guide rail and the gripper wheel, and a conveyor extends along a portion of the path of travel so that the gripper assemblies move the articles along the path of travel on to the conveyor.

20. The system of claim 15, wherein each of the gripper assemblies of the plurality of gripper assemblies comprises a pivot end that is pivotably mounted to a hub, and the engagement between the gripper assemblies and the spreader wheel causes the gripper assemblies to pivot relative to one another on the respective pivot ends, the gripper assemblies moving the respective articles relative to one another as the gripper assemblies pivot relative to one another when the gripper assemblies are in engagement with the respective articles.

21. The system of claim 20, wherein the cam followers slide along the respective slots as the gripper assemblies rotate about the gripper wheel axis, the movement of the cam followers in the respective slots causing the gripper assemblies to pivot on the respective pivot ends.

22. The system of claim 21, wherein the spreader wheel has a spreader wheel axis and the spreader wheel rotates about the spreader wheel axis, and the gripper wheel axis is offset from the spreader wheel axis, the offset between the gripper wheel axis and the spreader wheel axis causing the cam followers to slide along the respective slots when the gripper wheel and the spreader wheel rotate on the respective gripper wheel axis and spreader wheel axis.

23. The system of claim 22, wherein the slots extend radially in the spreader wheel so that the gripper assemblies are pivoted closer together as the respective cam followers slide along the respective slots toward the spreader wheel axis and the gripper assemblies are pivoted away from one another as the respective cam followers slide along the respective slots away from the spreader wheel axis when the gripper wheel and the spreader wheel rotate on the respective gripper wheel axis and spreader wheel axis.

24. The system of claim 15, wherein each of the gripper assemblies comprises a gripper arm having a pivot end and a gripper head opposite to the pivot end in the gripper assembly, the gripper heads being for engaging the respective articles.

25. The system of claim 24, wherein for each of the gripper assemblies the gripper head has a concave receiving face for engaging around a portion of a side of a respective article.

26. The system of claim 24, wherein each of the gripper assemblies comprises a grip element mounted to the gripper head, the grip element comprising a resilient material for being deformed when engaging a respective article.

27. The system of claim 15, wherein the articles are spaced apart from one another at the first pitch, and the articles are arranged at product pitch at the second pitch.

28. A system for at least partially changing article pitch, the system comprising:

a gripper wheel having a gripper wheel axis and comprising a plurality of gripper assemblies rotating about the gripper wheel axis, the gripper assemblies of the plurality of gripper assemblies sequentially engaging respective articles of a series of articles and moving the articles along a path of travel; and a spreader wheel positioned relative to the gripper wheel so that the gripper assemblies engage with the spreader wheel, the engagement between the gripper assemblies and the spreader wheel causing the gripper assemblies to move the respective articles relative to one another along the path of travel as the gripper assemblies rotate about the gripper wheel axis;

wherein the spreader wheel is mounted on a first drive shaft and the gripper wheel is mounted on a second drive shaft, and the first drive shaft is offset from the second drive shaft.

29. The system of claim 28, wherein the first drive shaft and the second drive shaft are coupled together by an offset coupling that transfers rotation of the second drive shaft on its axis to the first drive shaft on its axis.

30. The system of claim 28, wherein the first drive shaft is mounted to an upper frame assembly and second drive shaft is mounted to a lower frame assembly.

31. The system of claim 30, wherein the lower frame assembly is mounted to a base plate by an adjustment rail assembly, the adjustment rail assembly comprising a track mounted to the base plate and a rail bearing mounted to the lower frame assembly, and the rail bearing engages the track so that the rail bearing can translate along the track in order to adjust the position of at least the gripper wheel relative to the path of travel.

32. The system of claim 28, wherein the upper frame assembly is mounted to the lower frame assembly by a plurality of pivot bearings, the upper frame assembly being movable with respect to the lower frame assembly via the pivot bearings for moving the spreader wheel relative to the gripper wheel.

33. A system for at least partially changing article pitch, the system comprising:

a gripper wheel having a gripper wheel axis and comprising a plurality of gripper assemblies rotating about the gripper wheel axis, the gripper assemblies of the plurality of gripper assemblies sequentially engaging respective articles of a series of articles and moving the articles along a path of travel; and a spreader wheel positioned relative to the gripper wheel so that the gripper assemblies engage with the spreader wheel, the engagement between the gripper assemblies and the spreader wheel causing the gripper assemblies to move the respective articles relative to one another along the path of travel as the gripper assemblies rotate about the gripper wheel axis;

wherein each of the gripper assemblies comprises a gripper arm having a pivot end and a gripper head opposite to the pivot end in the gripper assembly, the gripper heads being for engaging the respective articles;

wherein for each of the gripper assemblies the gripper head is mounted to the gripper arm by an insert arm, the insert arm being at least partially received in an opening in the gripper arm.

34. A method of changing article pitch, the method comprising:

receiving a series of articles arranged at a first pitch;

engaging the articles of the series of articles sequentially with a gripper wheel comprising a plurality of gripper assemblies, wherein a spreader wheel is mounted on a first drive shaft and is positioned relative to the gripper wheel so that the gripper assemblies engage with the spreader wheel, and wherein the gripper wheel is mounted on a second drive shaft that is offset from the first drive shaft;

moving the articles along a path of travel with the gripper wheel; and moving the articles relative to one another from the first pitch to a second pitch during the moving the articles along the path of travel with the gripper wheel, wherein the moving the articles relative to one another comprises pivoting the gripping assemblies relative to one another due to the engagement between the gripper assemblies and the spreader wheel.

* * * * *